United States Patent [19]

Richardson

[11] Patent Number: 4,702,061

[45] Date of Patent: Oct. 27, 1987

[54] AUTOMATIC BASKET BAIL OPENING MACHINE

[75] Inventor: Robert G. Richardson, Shoreview, Minn.

[73] Assignee: Ex-Cell-O Corporation, Walled Lake, Mich.

[21] Appl. No.: 840,178

[22] Filed: Mar. 17, 1986

[51] Int. Cl.⁴ ............................................. B65B 43/26
[52] U.S. Cl. .................................... 53/381 R; 53/382; 414/411; 414/906
[58] Field of Search .................... 53/381 R, 382, 457, 53/564, 458, 566, 468; 414/411, 906

[56] References Cited

U.S. PATENT DOCUMENTS

| | | | |
|---|---|---|---|
| 3,019,924 | 2/1962 | Krupp et al. | 414/411 |
| 3,241,292 | 3/1966 | Berney | 53/382 |
| 3,247,646 | 4/1966 | McIntyre | 414/411 X |
| 3,296,769 | 1/1967 | Patton | 53/382 |
| 3,376,692 | 4/1968 | Berney | 53/382 |
| 3,448,560 | 6/1969 | Shuttleworth | 53/382 |
| 3,662,516 | 5/1972 | Wiseman | 53/382 X |
| 3,861,115 | 1/1975 | Peres | 53/382 X |
| 4,191,005 | 3/1980 | Vinoskey | 53/382 |
| 4,522,014 | 6/1985 | Robinson | 53/382 |
| 4,543,767 | 10/1985 | Wiseman | 53/382 X |
| 4,587,792 | 5/1986 | Hartness et al. | 53/382 |

Primary Examiner—Robert L. Spruill
Assistant Examiner—Steven P. Weihrouch
Attorney, Agent, or Firm—John P. Moran

[57] ABSTRACT

A machine for automatically opening oppositely disposed handles or bails which are collapsed into and onto the bottom of continuously moving bakery baskets or trays. A pair of air cylinder-actuated, pivotally mounted, arcuate shaped lift arms partially lift the bails at a first station. A pair of fixed, sloped plow bars lift the moving bails a further partial amount at a second station. The opening of the bails is completed by a pair of air cylinder-actuated cam surfaced fixtures at a third station, readying the baskets for loading.

3 Claims, 4 Drawing Figures

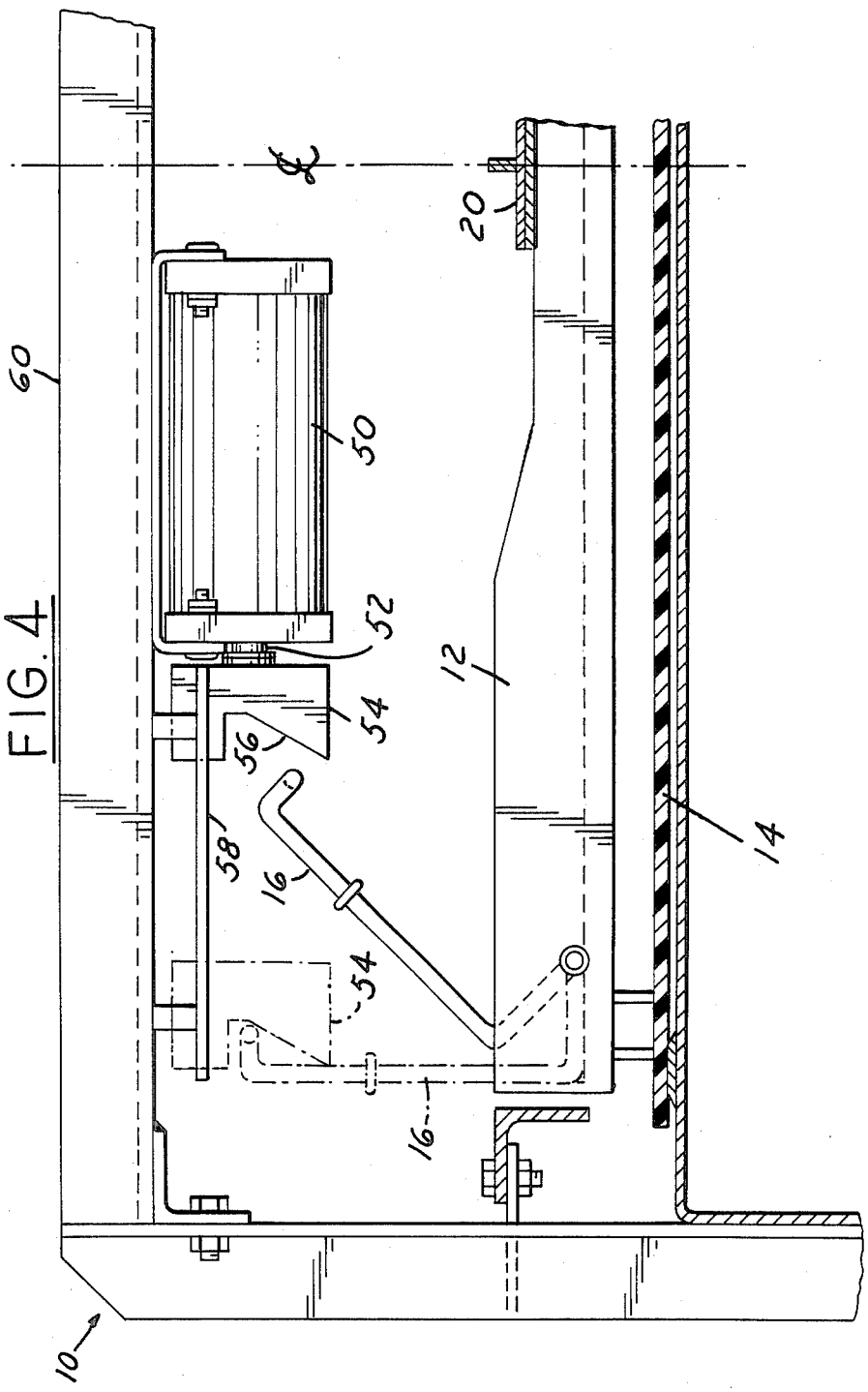

AUTOMATIC BASKET BAIL OPENING MACHINE

TECHNICAL FIELD

This invention relates generally to bakery basket or tray handling equipment and, more particularly, to machines for automatically lifting collapsed handles or bails of continu- ously moving baskets to prepare them for being loaded with bakery goods.

BACKGROUND ART

Heretofore, where baskets or trays having pivotally mounted handles or bails have had such bails collapsed inwardly to facilitate stacking of the baskets, the bails have generally been opened manually prior to the baskets being filled with bakery products. This bail opening step is time consuming and interruptive in the loading process.

Automatic means for opening side flaps on cardboard cases are known, but generally consist of a "plow" arrangement which a moving closed case engages, and which progressively raises the side flaps. Pivotally mounted hook members typically serve to open the trailing flap. Thereafter, the case is rotated 180° and the former leading flap is now trailing and opened by a further hook member. Such side and trailing flag opening means are shown and described in Barker et al U.S. Pat. No. 3,310,187. Berney U.S. Pat. No. 3,184,898 discloses a hook means for opening a leading closed flap of a case.

DISCLOSURE OF THE INVENTION

A general object of the invention is to provide improved means for automatically opening oppositely disposed collapsed handles or bails on bakery baskets or trays while they are being continuously moved by suitable conveyor means between basket unstacking and product loading stations.

Another object of the invention is to provide a mechanism for automatically opening oppositely disposed collapsed handles or bails on continuously moving bakery baskets or trays, wherein a pair of pivotally mounted lift arms are actuated at a first station to partially lift the bails from the bottom of each basket; a pair of fixed, sloped plow rails are engaged at a second station by the partially opened bails and serve to lift the bails a second predetermined partial amount; and at a third station a pair of laterally mounted cylinders with cam surfaces formed on the distal ends thereof serve to complete the opening process by pushing the bails to a vertical position.

These and other objects and advantages of the invention will be apparent when reference is made to the following description and accompanying drawings.

BRIEF DESCRIPTION OF THE DRAWINGS

FIG. 4 is an enlarged, fragmentary cross-sectional view, taken along the plane of the line 4—4, and looking in the direction of the arrows.

BEST MODE OF CARRYING OUT THE INVENTION

Figure 1:
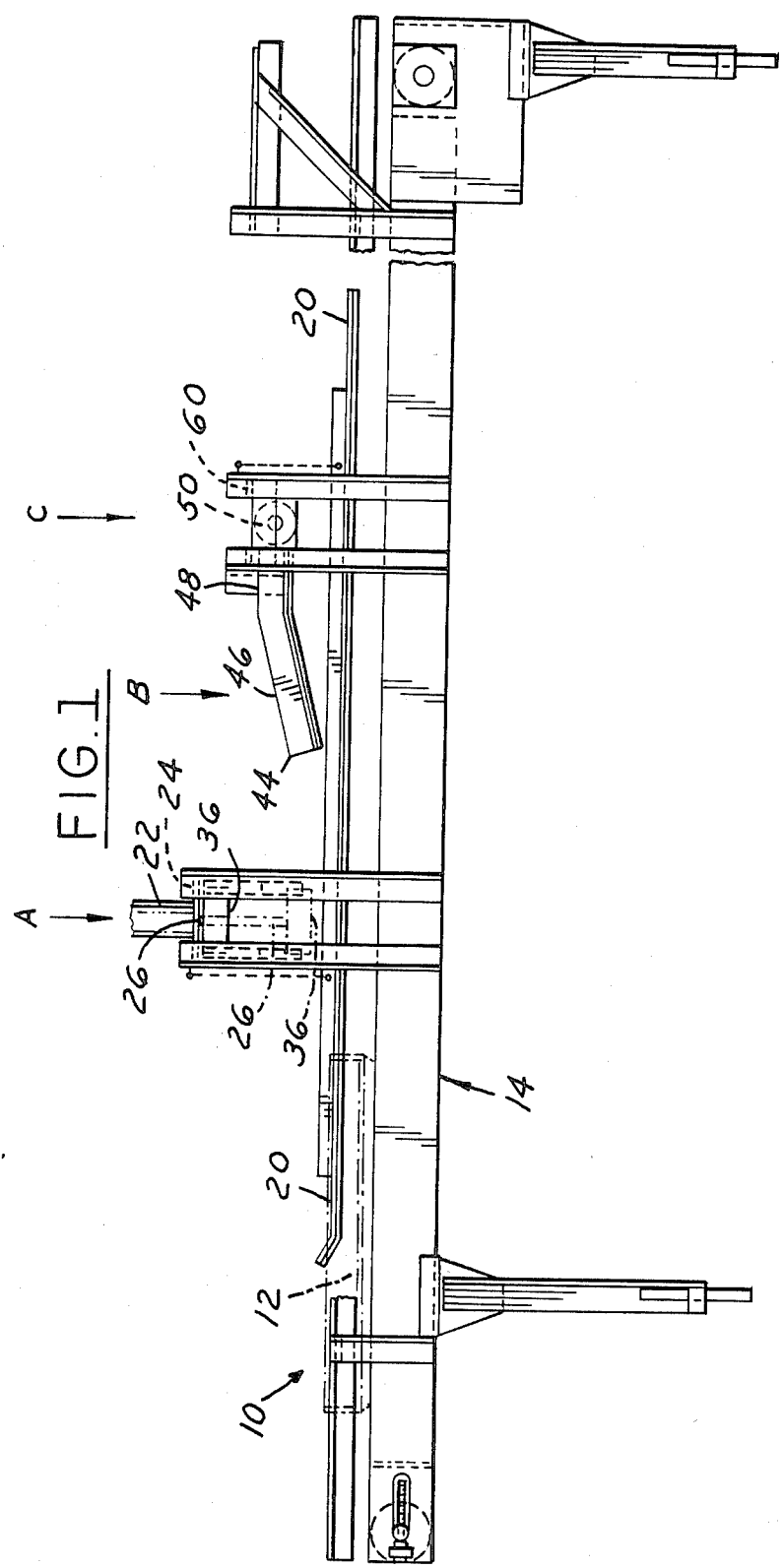
FIG. 1 is a side elevational view of a machine embodying the invention.
Figure 2:
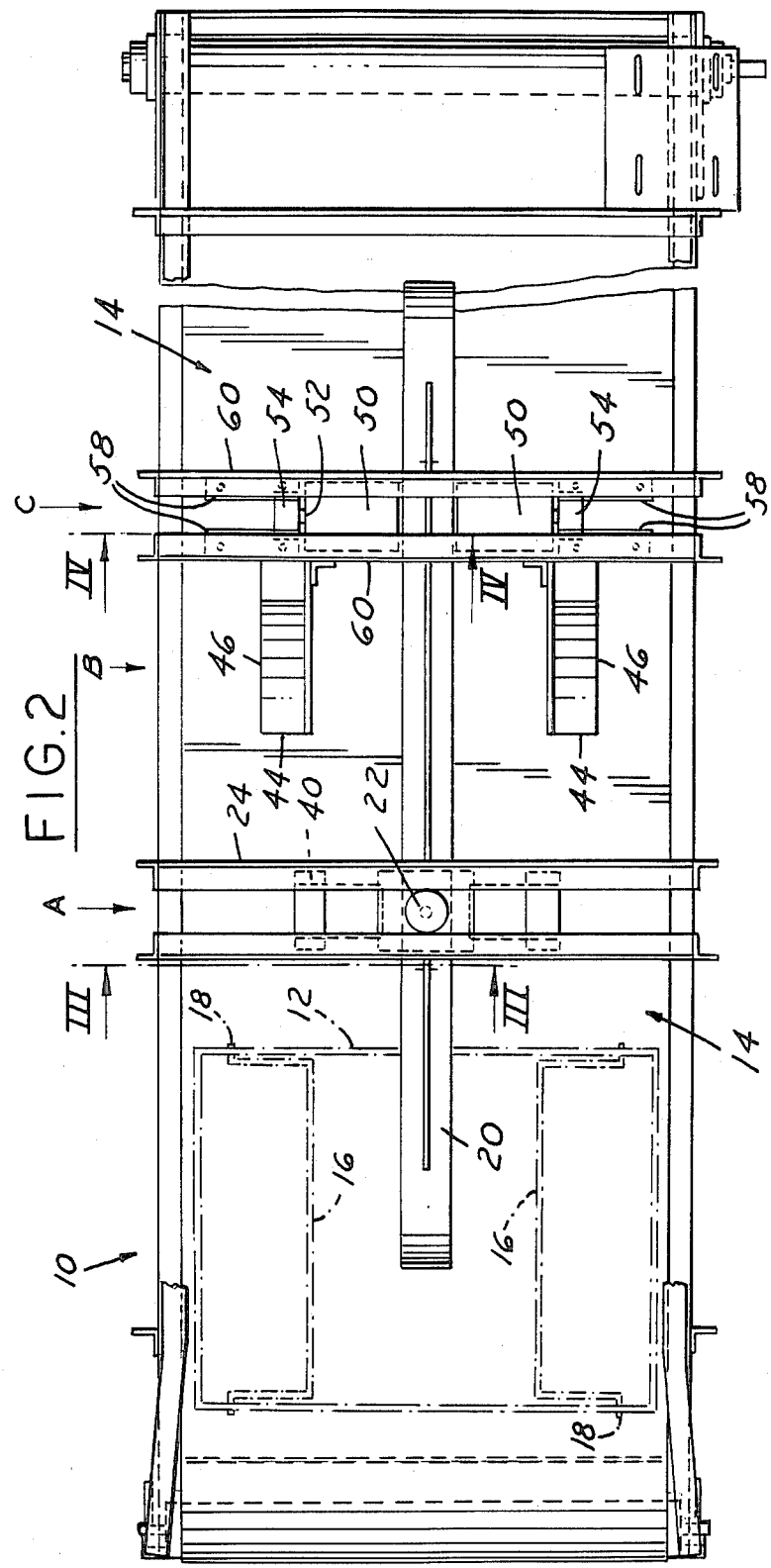
FIG. 2 is a plan view of the FIG. 1 structure.

Referring now to the drawings in greater detail, FIGS. 1 and 2 illustrate a basket bail opener machine 10, through which a basket 12 is continuously conveyed by a conveyor 14. A pair of handles or bails 16 formed of bent rods are pivotally mounted on respective leading and trailing pivot pins 18 (FIG. 3) on opposite sides of the basket 12. The basket 12 is fed by a separate inlet conveyor (not shown) to the conveyor 14 of the machine 10, with the bails 16 collapsed inwardly and downwardly against the bottom of the basket 12, as shown in FIG. 2 and in phantom in FIG. 3, to facilitate handling and/or stacking of the baskets upstream thereof. After traversing past three operating stations, as the basket 12 leaves the machine 10 on a discharge conveyor (not shown), the bails 16 have been fully opened into an upright position, ready for the baskets to be loaded or filled with a product, such as loaves of bread, downstream thereof. A description of the three stations follows.

After it enters the machine 10, each basket 12 is continuously conveyed along under a hold-down bar 20 as it approaches a first station, represented at A. An overhead, vertically mounted cylinder 22 (FIG. 2), centrally located on a suitable bracket 24, is actuated to extend its piston rod 26 (FIG. 3) downwardly.

Figure 3:
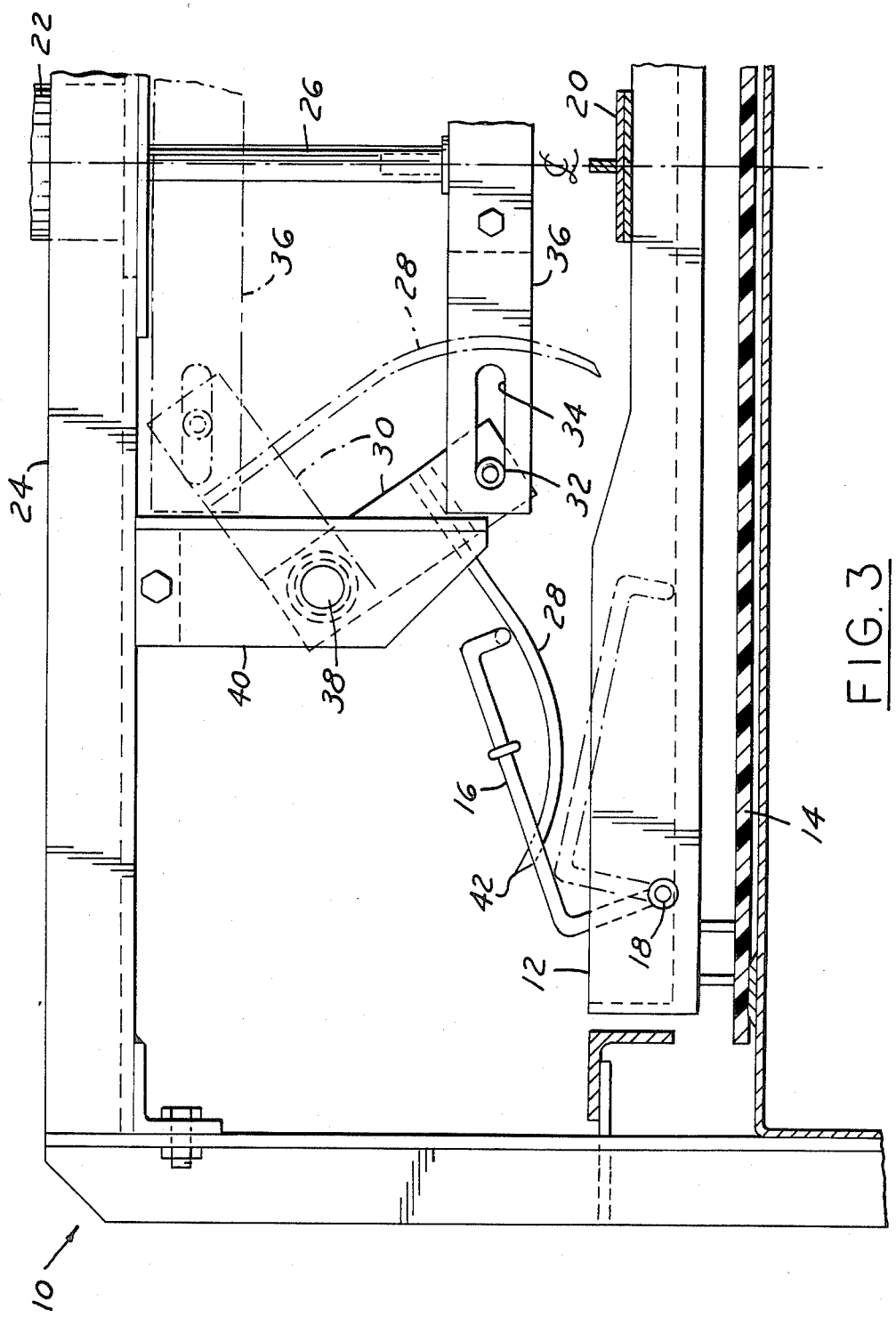
FIG. 3 is an enlarged, fragmentary cross-sectional view, taken along the plane of the line 3—3, and looking in the direction of the arrows.

As shown in FIG. 3, an arcuate shaped lift arm 28 is secured to a lever 20. A pin 32 is secured to one end of the lever 20 and mounted in a slot 34 formed in a laterally extending bar member 36 secured to the end of the vertical piston rod 26. The other end of the lever 30 is pivotally secured by a pivot pin 38 to a fixed bracket 40. It's apparent from FIG. 2 that there is a like lift arm 28, lever 30, and bracket 40 on the opposite end of the bar member 36. In operation, as the piston rod 26 moves downwardly, the oppositely disposed lift arms 28 are each caused to pivot outwardly toward the respective collapsed bails 16, by virtue of the pins 32 moving laterally in the respective slots 34, while the lever 30 pivots about the pivot pin 38.

A sharpened distal end 42 on each lift arm 28 moves under a respective bail 16 and raises the latter to a predetermined, partially lifted attitude as the arm pivots outwardly and upwardly. Inasmuch as the basket 12 is being continually moved forward by the conveyor 14, the lift arms slide along the length of the bails 16 while they pivot outwardly and upwardly.

At a second station, represented at B in FIG. 1 and 2, the partially lifted bails 16 engage the leading ends 44 of respective sloped, fixed plow bars 46, which continue to raise the oncoming bails 16 to a second predetermined, partially opened attitude. Concurrently, the lift arms 28 are returned by the retracting piston rod 26 and the interaction between the pin 32, the slot 34, and the lever 30, to their rest positions shown in phantom in FIG. 3, to be ready for the oncoming next basket 12.

Upon leaving the horizontally oriented rear end portion 48 of the plow bars 46, the basket enters a third station, represented at C in FIGS. 1 and 2, at which point two horizontally mounted and oppositely disposed cylinders 50, better seen in FIG. 4, are actuated to cause their respective piston rods 52 to move outwardly. A fixture 54 having a cam surface 56 formed thereon, is mounted on the distal end of each piston rod 52, and slidably retained between spaced guide rails 58 (FIG. 2). The cylinder 50 and guide rails 58 are supported on overhead brackets 60. The laterally moving fixture 54 engages a respective longitudinally moving bail 16 and causes the latter to slide generally upwardly along the surface 56 until the bail has been lifted to a vertical position, as shown in phantom in FIG. 4, ready for discharge from the machine 10 via a discharge conveyor to a downstream loading or filling operation. The fixtures 54 are withdrawn from the bails as soon as the latter attain their vertical positions.

INDUSTRIAL APPLICABILITY

It is apparent that the invention has provided an efficient, automatic means for raising inwardly collapsed bails of bakery baskets or trays to an upright, open condition, while the trays are continuously moving along a conveyor.

While but one embodiment of the invention has been shown and described, other modifications thereof are possible within the scope of the following claims.

The embodiments of the invention in which an exclusive property or privilege is claimed are defined as follows:

1. A machine for opening bails pivotally mounted on the sides of a basket or tray and collapsed inwardly and downwardly against the bottom of the basket or tray, said machine comprising a conveyor for continuously moving the basket or tray, a pair of cylinder-actuated, pivotally mounted arcuate-shaped lift arms for partially lifting the collapsed bails from the bottom of the basket or tray, a pair of longitudinally mounted, sloped, fixed plow bars for further partial opening of the bails, and a pair of horizontally mounted, cylinder-actuated fixtures for completing the opening of the bails into a vertical position.

2. The bail opening machine described in claim 1, and a fixed, vertically mounted air cylinder, a piston rod having a laterally extending bar member secured to the distal end thereof, a slot formed adjacent each end of the bar member, and a pair of fixed brackets, wherein the lift arms are each secured to a lever having one end thereof pivotally mounted on one of said fixed brackets, and having a laterally extending pin secured to the other end thereof and slidably mounted in a respective slot.

3. The bail opening machine described in claim 1, and two oppositely disposed, outwardly extending air cylinders, each having a piston rod with one of said fixtures secured to the distal end thereof, and a cam surface formed on each fixture for slidably engaging the respective bails.

* * * * *